United States Patent
Kim et al.

(10) Patent No.: US 12,078,128 B2
(45) Date of Patent: Sep. 3, 2024

(54) SYSTEM AND METHOD FOR SUPPLYING FUEL FOR SHIP

(71) Applicant: DAEWOO SHIPBUILDING & MARINE ENGINEERING CO., LTD., Geoje-Si (KR)

(72) Inventors: Seon Jin Kim, Siheung-si (KR); Seung Chul Lee, Seoul (KR); Hye Min Jung, Seoul (KR); Jin Ho Choi, Incheon (KR)

(73) Assignee: Hanwha Ocean Co., Ltd., Geoje-Si (KR)

( * ) Notice: Subject to any disclaimer, the term of this patent is extended or adjusted under 35 U.S.C. 154(b) by 170 days.

(21) Appl. No.: 17/754,366

(22) PCT Filed: Nov. 15, 2019

(86) PCT No.: PCT/KR2019/015711
§ 371 (c)(1),
(2) Date: Mar. 30, 2022

(87) PCT Pub. No.: WO2021/095948
PCT Pub. Date: May 20, 2021

(65) Prior Publication Data
US 2022/0333555 A1    Oct. 20, 2022

(51) Int. Cl.
*F02M 21/02*    (2006.01)
*B63B 25/14*    (2006.01)
(Continued)

(52) U.S. Cl.
CPC ......... *F02M 21/0221* (2013.01); *B63B 25/14* (2013.01); *B63H 21/38* (2013.01);
(Continued)

(58) Field of Classification Search
CPC ... F17C 5/02; F17C 7/02; B63H 21/38; B63B 25/14; F02M 21/0245; F02M 31/20; F02M 31/16; F02M 21/0221
See application file for complete search history.

(56) References Cited

U.S. PATENT DOCUMENTS

2014/0048042 A1* 2/2014 Gurin ............... F02D 41/3827
                                                            123/456
2015/0040856 A1   2/2015 Oka

FOREIGN PATENT DOCUMENTS

EP    2034168 A1      11/2009
JP    2001-248518 A    9/2001
(Continued)

OTHER PUBLICATIONS

Extended European Search Report dated Jul. 17, 2023 in European Application No. 19952742.5.
(Continued)

*Primary Examiner* — Kevin A Lathers
(74) *Attorney, Agent, or Firm* — Knobbe, Martens, Olson & Bear, LLP

(57) ABSTRACT

Disclosed herein are a fuel supply system for ships and a fuel supply method using the same. The fuel supply method includes: 1) supplying an excess amount of liquefied gas as fuel to an incompressible fluid-fueled engine (E); 2) cooling unconsumed fuel discharged from the engine (E) through heat exchange with liquefied gas discharged from a storage tank (T); 3) returning the unconsumed fuel discharged from the engine (E) and having been cooled through heat exchange in step 2) to the storage tank (T); and 4) supplying the liquefied gas discharged from the storage tank (T) and having been used as refrigerant for heat exchange in step 2) to the engine (E). The fuel supply method can prevent cavitation in the engine (E) by supplying the excess amount of liquefied gas sufficient to accommodate variation in load of the engine (E) as fuel to the engine (E).

4 Claims, 1 Drawing Sheet

(51) Int. Cl.
  *B63H 21/38* (2006.01)
  *F02M 31/16* (2006.01)
  *F02M 31/20* (2006.01)
  *F17C 5/02* (2006.01)
  *F17C 7/02* (2006.01)

(52) U.S. Cl.
  CPC ........ *F02M 21/0245* (2013.01); *F02M 31/16* (2013.01); *F02M 31/20* (2013.01); *F17C 5/02* (2013.01); *F17C 7/02* (2013.01); *F17C 2221/035* (2013.01); *F17C 2227/0135* (2013.01); *F17C 2227/0306* (2013.01); *F17C 2227/0339* (2013.01); *F17C 2265/066* (2013.01); *F17C 2270/0105* (2013.01)

(56) References Cited

FOREIGN PATENT DOCUMENTS

| | | |
|---|---|---|
| JP | 2008-008152 A | 1/2008 |
| JP | 2009-115180 A | 5/2009 |
| JP | 2014066231 A | 4/2014 |
| JP | 2018536116 A | 12/2018 |
| KR | 10-2015-0077917 A | 7/2015 |
| KR | 10-2016-0074965 A | 6/2016 |
| KR | 20160074965 A | 6/2016 |
| KR | 10-2016-0082033 A | 7/2016 |
| KR | 20160082033 A | 7/2016 |
| KR | 10-2017-0077558 A | 7/2017 |
| KR | 20170077558 A * | 7/2017 |
| KR | 10-2018-0093577 A | 8/2018 |
| KR | 20180093577 A | 8/2018 |
| KR | 101916696 B1 | 11/2018 |
| KR | 20190105841 A | 9/2019 |
| WO | 2018/202313 A1 | 11/2018 |

OTHER PUBLICATIONS

Notice of Refusal dated Oct. 2, 2023 in Japanese Application No. 2022-518297.
Office Action dated Sep. 6, 2023 in Chinese Application No. 201980101825.3.
International Search Report and Written Opinion in Application No. PCT/KR2019/015711 dated Aug. 3, 2020.
Notice of Reason for Refusal in the corresponding Japanese Application No. 2022-518297 dated Mar. 28, 2023.

* cited by examiner

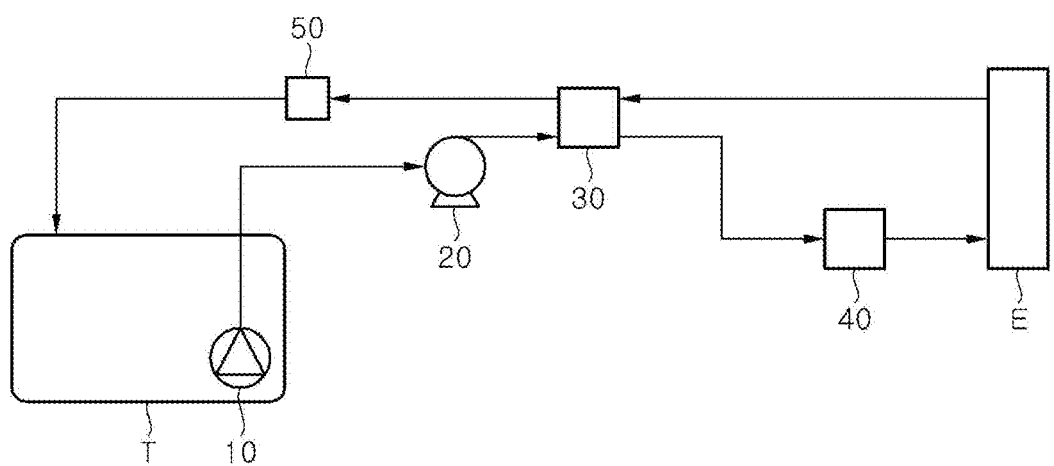

SYSTEM AND METHOD FOR SUPPLYING FUEL FOR SHIP

TECHNICAL FIELD

The present invention relates to a fuel supply system for ships, which uses an incompressible fluid such as liquefied petroleum gas as fuel for an engine, and a fuel supply method using the same.

BACKGROUND ART

In general, petroleum gas is transported to a distant destination by an LPG carrier after being transformed into liquefied petroleum gas (LPG) through liquefaction at cryogenic temperatures at a production site.

Conventionally, fuel oil, such as heavy fuel oil (HFO) or marine diesel oil (MDO), has been used as fuel for an engine of LPG carriers. As cargo of an LPG carrier, LPG is typically stored in a storage tank. Here, boil-off gas (BOG) generated in the storage tank is reliquefied in a reliquefaction plant and then delivered to and stored in the storage tank.

As such, in typical LPG carriers, fuel and cargo are handled or treated by separate systems and there is no means for using LPG stored as cargo in a storage tank as a fuel for an engine.

Recently, there is growing interest in a method of supplying LPG stored as cargo in a storage tank as fuel for an engine.

Disclosure

Technical Task

Embodiments of the present invention provide a fuel supply system for ships, in which unconsumed fuel discharged from an engine is cooled through heat exchange with liquefied gas discharged from a storage tank as fuel for the engine so as to reduce the volume of the unconsumed fuel before sending the unconsumed fuel back to the storage tank, and a fuel supply method for ships using the same.

Technical Solution

In accordance with one aspect of the present invention, there is provided a fuel supply method for ships, including: 1) supplying an excess amount of liquefied gas as fuel to an incompressible fluid-fueled engine (E); 2) cooling unconsumed fuel discharged from the engine (E) through heat exchange with liquefied gas discharged from a storage tank (T); 3) returning the unconsumed fuel discharged from the engine (E) and having been cooled through heat exchange in step 2) to the storage tank (T); and 4) supplying the liquefied gas discharged from the storage tank (T) and having been used as refrigerant for heat exchange in step 2) to the engine (E), whereby cavitation in the engine (E) is prevented through supply of the excess amount of liquefied gas sufficient to accommodate variation in load of the engine (E) to the engine (E).

In accordance with another aspect of the present invention, there is provided a fuel supply system for ships, including: a line through which unconsumed fuel discharged from an incompressible fluid-fueled engine (E) is returned to a storage tank (T); and a heat exchanger (30) provided to the line and cooling the unconsumed fuel through heat exchange with liquefied gas discharged from the storage tank (T), wherein the liquefied gas discharged from the storage tank (T) and having been used as refrigerant in the heat exchanger (30) is supplied to the engine (E), an excess amount of liquefied gas is supplied as fuel to the engine (E) to accommodate variation in load of the engine (E), and fuel remaining after use in the engine (E) is discharged from the engine (E) and is sent back to the storage tank (T) after passing through the heat exchanger (30).

The fuel supply system may further include: a first pump (10) disposed in the storage tank (T) and pumping the liquefied gas out of the storage tank (T).

The fuel supply system may further include: a second pump (20) disposed upstream of the heat exchanger (30) and pumping the liquefied gas discharged from the storage tank (T).

The fuel supply system may further include: a second pump (20) disposed downstream of the heat exchanger (30) and pumping the liquefied gas having undergone heat exchange in the heat exchanger (30).

The fuel supply system may further include: a heater (40) heating the liquefied gas discharged from the storage tank (T) and having been used as refrigerant in the heat exchanger (30) to a temperature required for the engine (E).

The fuel supply system may further include: a decompression unit (50) decompressing the unconsumed fuel discharged from the engine (E) and having been cooled by the heat exchanger (30) to an internal pressure of the storage tank (T) and sending the decompressed fuel to the storage tank (T).

In accordance with a further aspect of the present invention, there is provided a fuel supply method for ships, including: 1) supplying an excess amount of liquefied gas as fuel to an engine (E) and discharging unconsumed fuel from the engine (E); 2) cooling the unconsumed fuel discharged from the engine (E) through heat exchange with liquefied gas discharged from a storage tank (T); 3) returning the unconsumed fuel discharged from the engine (E) and having been cooled through heat exchange in step 2) to the storage tank (T); and 4) supplying the liquefied gas discharged from the storage tank (T) and having been used as refrigerant for heat exchange in step 2) to the engine (E).

Effects

The fuel supply system and method according to the present invention can reduce the volume of unconsumed fuel discharged from an engine in a simple and economical way without any additional refrigerant or device, thereby allowing reduction in capacity of a storage tank.

In addition, according to the present invention, since liquefied gas discharged from the storage tank is heated through heat exchange with the unconsumed fuel discharged from the engine before the liquefied gas is sent to a heater to be heated to a temperature required for the engine, energy consumed by the heater can be reduced.

DESCRIPTION OF DRAWINGS

FIG. 1 is a schematic diagram of a fuel supply system for ships according to one exemplary embodiment of the present invention.

EMBODIMENTS

Hereinafter, exemplary embodiments of the present invention will be described in detail with reference to the accompanying drawings. It should be understood that the present invention may be embodied in different ways and is not limited to the following embodiments.

FIG. 1 is a schematic diagram of a fuel supply system for ships according to one exemplary embodiment of the present invention.

Referring to FIG. 1, the fuel supply system for ships according to this embodiment includes a heat exchanger 30 cooling unconsumed fuel discharged from an engine E through heat exchange with liquefied gas discharged from a storage tank T.

The storage tank T according to this embodiment stores liquefied gas used as fuel for the engine E. The liquefied gas discharged from the storage tank T is used as refrigerant in the heat exchanger 30 before being supplied as fuel to the engine E.

According to this embodiment, after an excess amount of liquefied gas is supplied as fuel to the engine E, fuel not consumed by engine E is discharged from the engine E. The unconsumed fuel discharged from the engine E is sent to the heat exchanger 30. The unconsumed fuel sent to the heat exchanger 30 after being discharged from the engine E is returned to the storage tank T after being cooled by the heat exchanger 30.

In the case that a compressible gaseous fluid is supplied as fuel to the engine E, even when the engine E suddenly needs a large amount of fuel, it is possible to immediately supply the required amount of fuel to the engine by filling a fuel supply line with the compressible gaseous fluid to a pressure slightly higher than required for the engine E such that fuel, which is the compressible gaseous fluid, can be present in a state of being compressed to some degree in the fuel supply line. Accordingly, stable fuel supply can be achieved regardless of variation in load of the engine E.

Conversely, in the case that an incompressible liquid fluid is supplied as fuel to the engine E, it is impossible to use the method of filling the fuel supply line with fuel to a pressure slightly higher than required for the engine E since the incompressible liquid fluid undergoes insignificant volume change upon application of pressure to the fluid.

If the fuel requirement of the engine E fails to be met when the engine E suddenly needs a large amount of fuel, the engine E can suffer from cavitation.

Accordingly, the inventors of the present invention concluded that it is better to supply more fuel than required for the engine than to cause a situation in which the engine E is short of fuel.

According to this embodiment, a sufficient amount of liquefied gas to accommodate variation in load of the engine E, rather than only as much liquefied gas as needed for the engine E, is supplied to the engine E and liquefied gas not consumed by the engine E is discharged from the engine E.

Thus, according to the present invention, stable fuel supply to the engine can be ensured even when an incompressible liquid fluid is supplied as fuel to the engine.

According to this embodiment, the fuel supply system may supply liquefied gas to the engine E in an amount of 100% to 120% of the fuel requirement of the engine E, specifically in an amount of 110% of the fuel requirement of the engine E.

In addition, according to this embodiment, the unconsumed fuel discharged from the engine E may have a temperature of about 60° C. and a pressure of about 45 bar.

The fuel supply system according to this embodiment may further include at least one of: a first pump 10 disposed in the storage tank T to pump liquefied gas out of the storage tank T; a second pump 20 disposed upstream of the heat exchanger 30 to further pump the liquefied gas discharged from the storage tank T; a heater 40 heating the liquefied gas having been used as refrigerant in the heat exchanger 30 to a temperature required for the engine E; and a decompression unit 50 decompressing the unconsumed fuel discharged from the engine E and having been cooled by the heat exchanger 30 to an internal pressure of the storage tank T and sending the decompressed fuel to the storage tank T.

According to this embodiment, the liquefied gas discharged from the storage tank T is sent to the heat exchanger 30 to undergo heat exchange after being pumped by the second pump 20, as shown in FIG. 1. However, it should be understood that the present invention is not limited thereto and the liquefied gas discharged from the storage tank T may be pumped by the second pump 20 after undergoing heat exchange in the heat exchanger 30 (that is, the second pump 20 may be disposed downstream of the heat exchanger 30).

The heater 40 according to this embodiment may heat the liquefied gas to a temperature of about 40° C. to about 50° C., specifically about 45° C.

The decompression unit 50 according to this embodiment may decompress the liquefied gas to a pressure of about 15 bar to about 20 bar, specifically about 19 bar. Here, the fluid decompressed to a pressure of about 19 bar by the decompressor 50 may have a temperature of about 48° C.

The decompression unit 50 according to this embodiment may be any device adapted to reduce the pressure of fluid, specifically an expansion valve such as a Joule-Thomson valve.

When the fuel supply system includes the decompression unit 50, there can be problems such as increase in temperature of the liquefied gas in the storage tank T and necessity of increasing the capacity of the storage tank T due to high temperature and large volume of the fluid decompressed by the decompression unit 50. However, according to this embodiment, it is possible to prevent these problems since the unconsumed fuel discharged from the engine E is cooled by the heat exchanger 30 before being sent to the decompression unit 50. Thus, the fuel supply system according to this embodiment can be advantageously used in applications employing the decompression unit 50.

In addition, when the fuel supply system according to this embodiment includes the heater 40, the liquefied gas discharged from the storage tank T is sent to the heater 40 after being used as refrigerant in the heat exchanger 30. That is, the liquefied gas discharged from the storage tank T is heated through heat exchange in the heat exchanger 30 before being sent to the heater 40. Thus, according to this embodiment, energy consumed by the heater 40 can be reduced.

Although some embodiments have been described herein, it will be apparent to those skilled in the art these embodiments are provided for illustration only and are not to be construed in any way as limiting the present invention, and that various changes and modifications may be made without departing from the spirit and scope of the present invention.

The invention claimed is:

1. A fuel supply method for ships, comprising:
supplying an excess amount of liquefied gas as fuel to an incompressible fluid-fueled engine;
cooling unconsumed fuel discharged from the engine through heat exchange with liquefied gas discharged from a storage tank in a heat exchanger;
returning the unconsumed fuel discharged from the engine and having been cooled through heat exchange in the cooling step to the storage tank; and supplying the liquefied gas discharged from the storage tank and having been used as refrigerant for heat exchange in the cooling step to the engine, whereby cavitation in the engine is prevented through supply of the excess amount of liquefied gas sufficient to accommodate variation in load of the engine to the engine, wherein the liquefied gas discharged from the storage tank is pumped by a pump at upstream of the heat exchanger, and wherein the unconsumed fuel cooled by the heat exchanger is decompressed to an internal pressure of the storage tank by a decompression unit disposed between the heat exchanger and the storage tank and sent to the storage tank.

2. A fuel supply system for ships, comprising:

a line through which unconsumed fuel discharged from an incompressible fluid-fueled engine is returned to a storage tank;

a heat exchanger provided to the line and configured to cool the unconsumed fuel through heat exchange with liquefied gas discharged from the storage tank;

a pump disposed upstream of the heat exchanger and configured to pump the liquefied gas discharged from the storage tank; and a decompression unit disposed between the heat exchanger and the storage tank and configured to decompress the unconsumed fuel discharged from the engine and having been cooled by the heat exchanger to an internal pressure of the storage tank and sending the decompressed fuel to the storage tank, wherein the liquefied gas discharged from the storage tank and having been used as refrigerant in the heat exchanger is supplied to the engine, an excess amount of liquefied gas is supplied as fuel to the engine to accommodate variation in load of the engine, and fuel remaining after use in the engine is discharged from the engine and is sent back to the storage tank after passing through the heat exchanger.

3. The fuel supply system according to claim 2, further comprising:

an additional pump disposed in the storage tank and configured to pump the liquefied gas out of the storage tank.

4. The fuel supply system according to claim 2, further comprising:

a heater configured to heat the liquefied gas discharged from the storage tank and having been used as refrigerant in the heat exchanger to a temperature required for the engine.

* * * * *